L. A. SMITH.
NUT LOCK.
APPLICATION FILED APR. 21, 1908.
909,033.
Patented Jan. 5, 1909.
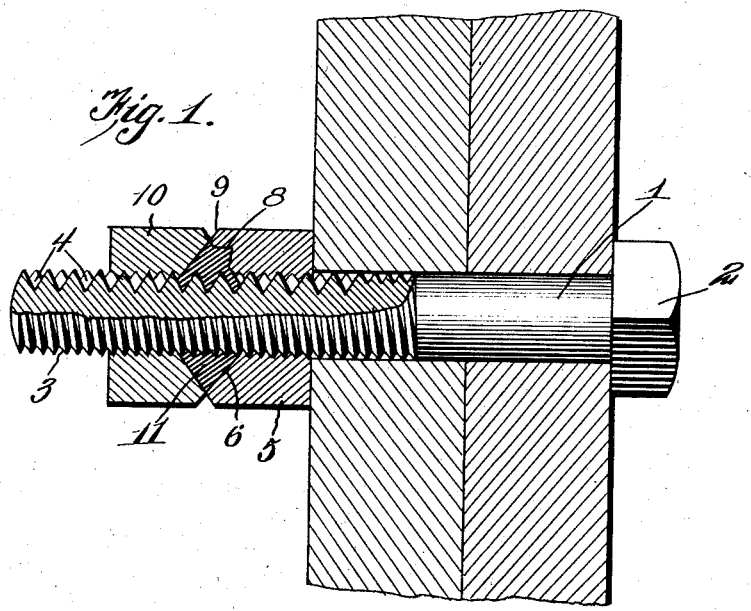
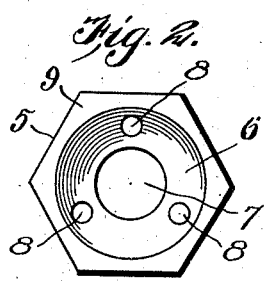
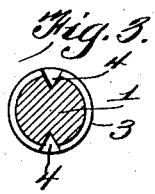
Witnesses
Louis R. Heinrichs
Inventor
Lewis A. Smith
By Victor J. Evans
Attorney

UNITED STATES PATENT OFFICE.

LEWIS A. SMITH, OF AKRON, OHIO.

NUT-LOCK.

No. 909,033.   Specification of Letters Patent.   Patented Jan. 5, 1909.

Application filed April 21, 1908. Serial No. 428,328.

*To all whom it may concern:*

Be it known that I, LEWIS A. SMITH, a citizen of the United States of America, residing at Akron, in the county of Summit and State of Ohio, have invented new and useful Improvements in Nut-Locks, of which the following is a specification.

This invention relates to nut locks, and one of the principal objects of the same is to provide a simple lock which will be practically out of sight when the nut is turned "home" on the bolt.

Another object of the invention is to provide a nut lock which will require but slight alteration in the nut and bolt.

These and other objects may be attained by means of the construction illustrated in the accompanying drawing, in which,—

Figure 1 is a partial longitudinal sectional view of a bolt and a nut locked upon said bolt in accordance with my invention. Fig. 2 is a face view of the nut. Fig. 3 is a transverse section of the bolt. Fig. 4 is a sectional view of the ductile washer or gasket.

Referring to the drawing for a more specific description of my invention, the numeral 1 designates a bolt which may be provided with the usual head 2 and threaded portion 3. Formed longitudinally of the bolt is one or more V-shaped indentations 4 which intersect the threads of the bolt and extend beyond the threads into the body of the bolt, as shown more particularly in Fig. 3.

In carrying out my invention I make use of two nuts which are substantially identical in contour, one of said nuts, however, being disposed oppositely to the other. Each of these nuts consists of a body portion 5 having a bore and screw threads to fit the bolt. The outer face of this nut has a concaved or inwardly beveled portion 6 which surrounds the bore 7 of the bolt, and in this beveled or concaved portion is a series of depressions or indentations 8. The marginal portions of the face of the bolt are beveled, as at 9. The outer nut 10 is substantially identical with the inner nut, with the exception that the threads run from the concaved portion to the flat outer face in an opposite direction to the other nut, so that when the concaved faces of said nuts are brought together, the screw threads will then extend in the same direction through both nuts. When the inner nut is screwed home and a washer or gasket 11 made of lead or some similar material is placed upon the bolt and the outer nut is placed upon the bolt and screwed against the washer, the latter will spread in the indentations 4 and will practically fill the spaces 6 between the nuts, while the beveled portions 9 will have a tendency to cut away any of the leaden gasket which might be spread and forced outward beyond the sharp cutting surface formed by the bevels 9.

From the foregoing it will be obvious that in order to remove the nut from the bolt the nut 10 must first be removed; the gasket 11 must then be removed from the inner bolt, and the latter may then be removed.

My invention is of simple construction, but is very efficient in use and will lock the inner nut firmly in place and prevent its being removed by jarring or by any of the natural movements which generally loosen the nut.

Having thus described the invention, what is claimed as new, is:—

The herein described nut lock comprising a bolt having indentations in opposite sides of the threaded portion thereof, a nut having an inwardly beveled face and provided with a series of depressions in said beveled face, a compressible ring or gasket, and an auxiliary nut having a face beveled oppositely to that of said nut, said gasket being compressed to force some of the material of the compressible ring into the indentations in the bolt and into the depressions in the face of the first mentioned nut, said nut and auxiliary nut having oppositely beveled contacting portions to cut away the surplus material from the gasket.

In testimony whereof I affix my signature in presence of two witnesses.

LEWIS A. SMITH.

Witnesses:
ARTHUR BARTON,
JOHN MOTZ.